United States Patent
Lefevre

(10) Patent No.: US 9,438,957 B2
(45) Date of Patent: Sep. 6, 2016

(54) TARGETED ADVERTISING

(75) Inventor: Chad Andrew Lefevre, Indianapolis, IN (US)

(73) Assignee: THOMSON LICENSING, Issy les-Moulineaux (FR)

(*) Notice: Subject to any disclaimer, the term of this patent is extended or adjusted under 35 U.S.C. 154(b) by 0 days.

(21) Appl. No.: 14/371,313

(22) PCT Filed: Feb. 15, 2012

(86) PCT No.: PCT/US2012/025180
§ 371 (c)(1),
(2), (4) Date: Jul. 9, 2014

(87) PCT Pub. No.: WO2013/122577
PCT Pub. Date: Aug. 22, 2013

(65) Prior Publication Data
US 2015/0007208 A1   Jan. 1, 2015

(51) Int. Cl.
| | |
|---|---|
| *H04N 7/16* | (2011.01) |
| *H04N 21/475* | (2011.01) |
| *H04N 21/258* | (2011.01) |
| *H04N 21/81* | (2011.01) |
| *G06Q 30/02* | (2012.01) |
| *H04N 21/2668* | (2011.01) |

(52) U.S. Cl.
CPC ...... *H04N 21/4756* (2013.01); *G06Q 30/0242* (2013.01); *G06Q 30/0251* (2013.01); *H04N 21/25891* (2013.01); *H04N 21/812* (2013.01); *H04N 21/2668* (2013.01)

(58) Field of Classification Search
CPC .................................................. H04N 21/2668
USPC .............................................. 725/34–36, 13
See application file for complete search history.

(56) References Cited

U.S. PATENT DOCUMENTS

| | | | |
|---|---|---|---|
| 7,840,986 B2 | 11/2010 | Ali et al. | |
| 8,656,426 B2 * | 2/2014 | Leigh et al. | 725/34 |
| 9,178,632 B2 | 11/2015 | Grob et al. | |

(Continued)

FOREIGN PATENT DOCUMENTS

| | | |
|---|---|---|
| EP | 2246813 | 11/2009 |
| JP | 2001325519 | 11/2001 |

(Continued)

OTHER PUBLICATIONS

Dureau et al., "Addressable Advertising on Digital Television," International Broadcasting Conference 2004, Sep. 10-14, 2004, Amsterdam, Sep. 10, 2004, 16 pages.

(Continued)

*Primary Examiner* — Pankaj Kumar
*Assistant Examiner* — Sahar Baig
(74) *Attorney, Agent, or Firm* — Brian J. Dorini; Catherine A. Cooper

(57) ABSTRACT

A method and apparatus for serving targeted advertising to a user via a user device are described including receiving content provided by a content provider, rendering the provided content, viewing a commercial, wherein the commercial was spliced into the content based on a default commercial selection algorithm at a commercial break, determining if the user wants to rate the commercial, accepting the user's rating of the commercial if the user wants to rate the commercial and communicating the user's rating of the commercial to the content provider.

17 Claims, 7 Drawing Sheets

(56) References Cited

U.S. PATENT DOCUMENTS

| | | | |
|---|---|---|---|
| 2001/0042018 A1 | 11/2001 | Koga | |
| 2002/0178448 A1 | 11/2002 | Te Kiefte et al. | |
| 2002/0199194 A1 | 12/2002 | Ali | |
| 2008/0022302 A1 | 1/2008 | Tanaka et al. | |
| 2009/0254934 A1* | 10/2009 | Grammens | 725/14 |
| 2009/0259518 A1* | 10/2009 | Harvey | G06Q 10/0639 705/7.29 |
| 2009/0292608 A1* | 11/2009 | Polachek | G06Q 30/0245 705/14.44 |
| 2010/0042403 A1 | 2/2010 | Chandrasekar et al. | |
| 2010/0251278 A1* | 9/2010 | Agarwal et al. | 725/9 |
| 2011/0106630 A1* | 5/2011 | Hegeman et al. | 705/14.71 |
| 2011/0154386 A1 | 6/2011 | Cochinwala et al. | |

FOREIGN PATENT DOCUMENTS

| | | |
|---|---|---|
| JP | 2001357191 | 12/2001 |
| JP | 2002529974 | 9/2002 |
| JP | 2002314523 | 10/2002 |
| JP | 2003189284 | 7/2003 |
| JP | 2005006105 | 1/2005 |
| JP | 2006005767 | 1/2006 |
| JP | 200817372 | 1/2008 |
| JP | 2010218480 | 3/2009 |
| JP | 2012501615 | 1/2012 |
| KR | 2011092641 | 8/2011 |
| WO | WO9966719 | 12/1999 |
| WO | WO0027124 | 5/2000 |
| WO | WO2011056388 | 5/2011 |
| WO | WO2012011011 | 1/2012 |

OTHER PUBLICATIONS

ISR for PCT/US2012/025180 dated Aug. 2, 2012.
ISR for PCT/US2012/025182 dated Apr. 25, 2012.
ISR for PCT/US2012/025184 dated Apr. 23, 2002.

* cited by examiner

TARGETED ADVERTISING

This application claims the benefit, under 35 U.S.C. §365 of International Application PCT/US2012/025180, filed Feb. 15, 2012, which was published in accordance with PCT Article 21(2) on Aug. 22, 2013 in English.

FIELD OF INVENTION

The present invention relates generally to advertising and, in particular to allowing a user (viewer) of video services to change and impact the advertising he/she views. That is, the present invention provides for improved targeted advertising.

BACKGROUND OF THE INVENTION

Advertisements (like many things) are a matter of personal preference. Some people found the Taco Bell dog funny and endearing. Other people disliked the Taco Bell dog commercials. As time passed, some people moved from the first camp into the second. To a viewer of commercials, good commercials can have a great effect: I like that commercial, so I'm more inclined to buy/use that product. It has been largely overlooked that bad commercials can have the opposite effect. Viewers will avoid products that are represented by bad commercials. Or, similarly as illustrated above, repetition can cause viewers to start avoiding the product over time. In the case of certain events (watching college basketball all day on a Saturday, for example), the same commercials are shown repeatedly, causing even a good commercial to have the effect of a bad commercial.

Advertisers make advertisements to appeal to viewers to entice them to buy their product(s). Frequently, a bad advertisement will turn a viewer off of a product, and repetition of a bad advertisement can make a viewer avoid a product altogether. Over-repetition of a good advertisement can have an adverse effect as well.

SUMMARY OF THE INVENTION

In multicast and broadcast applications, data are transmitted from a server to multiple receivers over wired and/or wireless networks. A multicast system as used herein is a system in which a server transmits the same data to multiple receivers simultaneously, where the receivers form a subset of all the receivers up to and including all of the receivers. A broadcast system is a system in which a server transmits the same data to all of the receivers simultaneously. That is, a multicast system by definition can include a broadcast system.

The present invention allows a viewer of video services to influence the advertisements that he/she views. The present invention allows the user to rank advertisements so that the advertising (ad) server is able to transmit (send) more effective advertisements to the user. At the same time, invaluable feedback would be presented to the advertisers, allowing them to keep up with current trends in viewing. The present invention would also allow user rankings to be changed, to keep up with their current preferences.

The present invention system would allow feedback from the viewer to change the advertisements that are served to that particular viewer, making the experience better for the viewer and the advertiser as well. Engaging the user may also cut down on "channel surfing," as the user may be more inclined to watch the advertisements if he/she knows he/she can affect the advertisements (ads). Feedback from the present would be made available to the advertiser, thus creating an environment where actual user feedback would drive new advertisements.

The present invention is similar to the Nielsen Ratings system, in that the feedback from users will be made available to the advertisers (the broadcasters in the Nielsen world) and can be used to determine which advertisements are preferred. This, in turn, may shape future advertisements (commercials). The present invention is a system based on rankings, such as TV shows, movies, products, etc. . . . ).

A method and apparatus for serving targeted advertising to a user via a user device are described including receiving content provided by a content provider, rendering the provided content, viewing a commercial, wherein the commercial was spliced into the content based on a default commercial selection algorithm at a commercial break, determining if the user wants to rate the commercial, accepting the user's rating of the commercial if the user wants to rate the commercial and communicating the user's rating of the commercial to the content provider. Also described are a method and apparatus for a content provider to provide targeted advertising to a user device including communicating content to the user device for rendering, retrieving the user's profile, determining if the user has a user specific commercial selection algorithm, splicing a commercial into the content based on the user specific commercial selection algorithm and the user's profile prior to a commercial break, serving the commercial to the user device, determining if user feedback regarding rating of the served commercial has been received, modifying the user's user specific commercial selection algorithm if feedback was received and splicing the commercial into the content based on a default commercial selection algorithm prior to a commercial break if no user specific commercial selection algorithm was located.

A method and apparatus for using commercial ratings are described including receiving user feedback, rating commercials from a plurality of users, collecting commercial related data, aggregating the commercial related data and the commercial ratings, calculating statistics based on the aggregated data and applying the statistics to a default commercial selection algorithm.

A method and apparatus are described including receiving content provided by a content provider, rendering the provided content, viewing a commercial, wherein the commercial was spliced into the content based on a default commercial selection algorithm at a commercial break, determining if the user wants to rate the commercial, accepting the user's rating of the commercial if the user wants to rate the commercial, and communicating the commercial and the user's rating of the commercial to one or more social networking sites.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

Figure 1A:
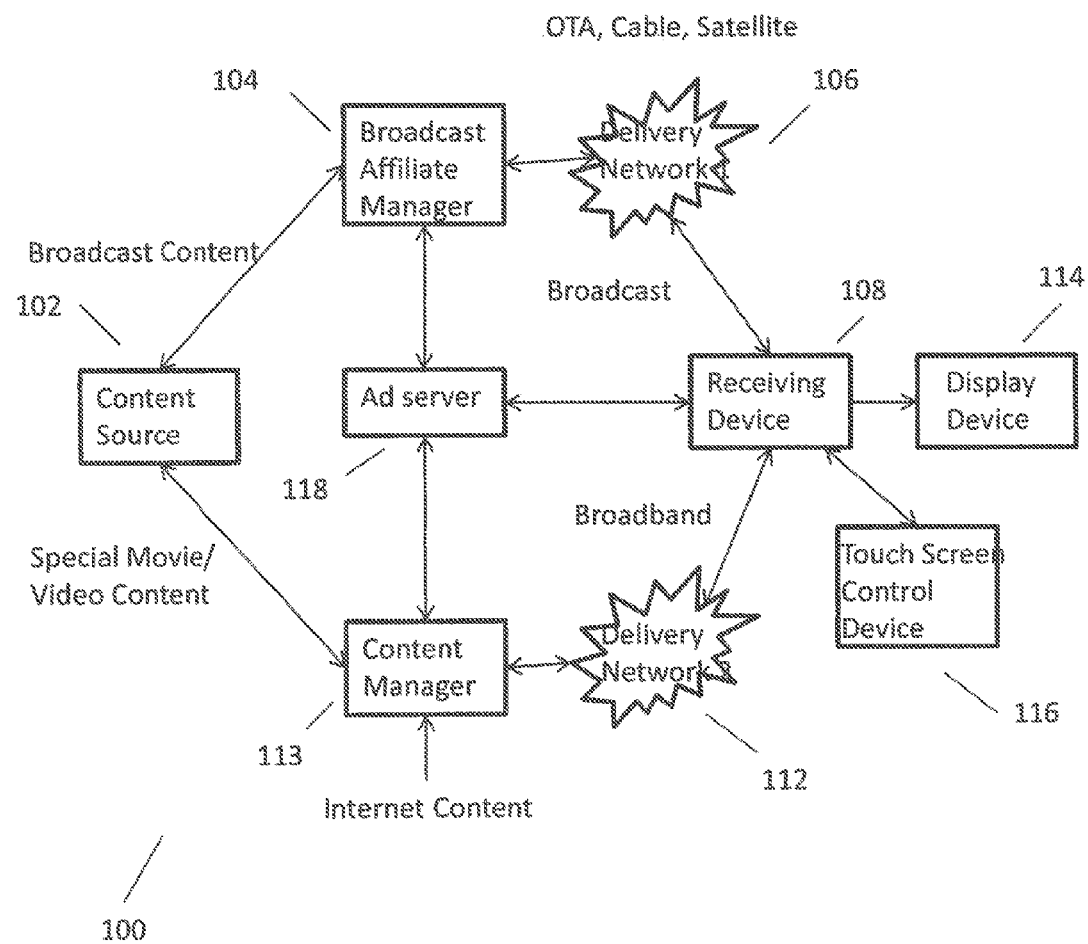
FIG. 1A is a block diagram of an exemplary system for delivering content to a user (such as a home or end user or client).

The present invention rectifies both over-repetition of good advertisements and rendering of bad commercials. It will make viewers happier and advertisers happier, and therefore content providers and Multiple System Operators (MSOs) happier. The present invention is a system that requires some form of two way communication with the video service. The present invention interacts with a video server and includes the local STB, which could be, for example, a PC, or a mobile device, interactive TV or any other form of client device. On the server, there is a preference engine that makes decisions on which advertisements to transmit (send out, broadcast, multicast). In the preferred embodiment, the advertisement decisions are targeted to an individual STB or household.

As the viewer is watching a program, he/she has the ability to rank the advertisement being rendered (displayed). The ability of the user to rank advertisements may be through dedicated buttons on a remote control, or pop-ups on the screen that can be selected, or gesture based on an alternative system such as a mobile phone or tablet, etc. . . . . The ranking may be, for example from 1 to 5 or any other convenient choice of ranking levels. The ranking level information would be transmitted (sent back) to the server. The server could then use the received ranking level information to tweak a preferences profile of the current user or household.

Additionally, these rankings would be stored and aggregated together to give anonymous feedback to the advertisers as to which commercials are doing well and which are not. This would allow advertisers to pull commercials that are not having a good effect on consumers and to create new commercials that are similar to what viewers currently like. This would also serve to tell the advertisers when a commercial (i.e. Taco Bell Dog) is starting to move from liked to disliked. If the advertisers stop the commercials at the right time, they are remembered well. If the advertisers allow even good commercials to be overplayed, they are remembered badly.

The user would be able to change his/her ranking of the commercial at any given time. In this way, advertisers would be able to determine if certain ads are overplayed or underplayed and adjust advertisement rendering accordingly.

This feedback would be very valuable to the advertisers. There are (and have been) television shows (programs) that do not do well in the rankings, but do very well with certain key demographics. These programs stay on the air because broadcasters can charge more money for the advertisements during these shows, as the advertisers want to access these specific demographics. That is, ads will be played (rendered) in certain geographical areas based on the local demographics and not through any sort of interactivity. Canoe Ventures, Enhanced TV Binary Interchange Format (EBIF) and tru2way allow users to interact with advertisements on a macro-level. That is, for example, a user (viewer) can click on a button that pops up during an ad for Ford Focus to get additional information about one or more features of the Ford Focus. This sort of macro-level interactivity is not the micro-level of interaction of the present invention. Allowing the ranking of advertisements coupled with their knowledge of viewer demographics of the show would allow the advertisers to discover what viewer demographics are positive for their advertisements. Advertisements viewed online or via interactive TV are static (pre-embedded into the video (content) stream or spliced into the content stream) and limited in nature. Often, the same ad is broadcast (multicast) a number of times. The present invention uses an ad server to splice ads that the user would prefer based on the user ranking (rating) of the ads into the content (video) stream. The targeted advertising of the present invention uses digital insertion to splice in the preferred ads.

FIG. 1A is a block diagram of an exemplary system for delivering content to a user (such as a home or end user or client). The content originates from a content source 102, such as a movie or production house. The content may be supplied in at least one of two forms. One form may be a broadcast form of content. The broadcast content is provided to the broadcast affiliate manager 104, which is typically a national broadcast service, such as the American Broadcasting Company (ABC), National Broadcasting Company (NBC), Columbia Broadcasting System (CBS), etc. The broadcast affiliate manager may collect and store the content and may schedule delivery of the content over a delivery network, shown as delivery network 1 (106). Delivery network 1 (106) may include satellite link transmission from a national center to one or more regional or local centers. Delivery network 1 (106) may also include local content delivery using local delivery networks (systems) such as over the air broadcast, satellite broadcast or cable broadcast, or the internet. The locally delivered content is provided to a receiving device 108 in a user's home, where the content will subsequently be searched by the user. It is to be appreciated that receiving device 108 can take many forms and may be embodied as a set top box, a digital video recorder (DVR), a gateway, a modem, a digital TV etc. Further, the receiving device may act as an entry point or a gateway for a home network system that includes additional devices configured as either client or peer devices in the home network.

A second form of content is referred to as special content. Special content may include content delivered as premium viewing, pay-per-view or other content not provided to the broadcast affiliate manager, e.g., movies, video games or other video elements. In many cases, the special content may be content requested by the user. The special content may be delivered to a content manager 113. The content manager 113 may be a service provider, such as an internet website, affiliated, for example, with a content provider, broadcast service or delivery network service. The content manager 113 may also incorporate internet content into the delivery system. The content manager 113 may deliver the content to the user's receiving device 108 over a separate delivery network, delivery network 2 (112). Delivery network 2 (112) may include high-speed broadband internet communications systems. It is important to note that the content from the broadcast affiliate manager 104 may also be delivered using all or parts of delivery network 1 (106). In addition, the user may also obtain content directly from the internet via delivery network 2 (112) without necessarily having content managed by content manager 113.

Several adaptations for utilizing the separately delivered content may be possible. In one possible approach, the special content is provided as an augmentation to the broadcast content, providing alternative displays, purchase and merchandising options, enhancement material, etc. In another adaptation, the special content may completely replace some programming content provided as broadcast content. Finally, the special content may be completely separate from the broadcast content, and may simply be a media alternative that the user may choose to utilize. For instance, the special content may be a library of movies that are not yet available as broadcast content.

Receiving device 108 may receive different types of content from one or both of delivery network 1 and delivery network 2. Receiving device 108 processes the content and provides a separation of the content based on user preferences and commands. Receiving device 108 may also include a storage device, such as a hard drive or optical disk drive, for recording and playing back content (audio, video and multimedia content). Further details of the operation of receiving device 108 are described below in relation to FIG. 1C. The processed content is provided to a display device 114, which may be a conventional 2-D type display or may alternatively be an advanced 3-D display.

Receiving device 108 may also be interfaced to a touch screen control device 116, which may be adapted to provide user control of receiving device 108 and/or display device 114. Touch screen device 116 may also be capable of displaying content, which may be graphics entries, such as user interface entries, or may be a portion of the content that is delivered to display device 114. Touch screen control device 116 may interface to receiving device 108 using any well known signal transmission system, such as infrared (IR) or radio frequency (RF) communications and may include standard protocols such as infrared data association (IRDA) standard, Wi-Fi, Bluetooth and the like or any other proprietary protocols. Operations of touch screen control device 116 will be described in further detail below.

Advertising server (ad server) 118 is a device that has ads (commercials) stored therein and that may be connected to any one or more of the Broadcast Affiliate Manager 104, the Content Manager 113 and/or the receiving device 108. The ads may be delivered to any one or more of the Broadcast Affiliate Manager 104, the Content Manager 113 and/or the receiving device 108 and spliced into the content by same.

Figure 1B:
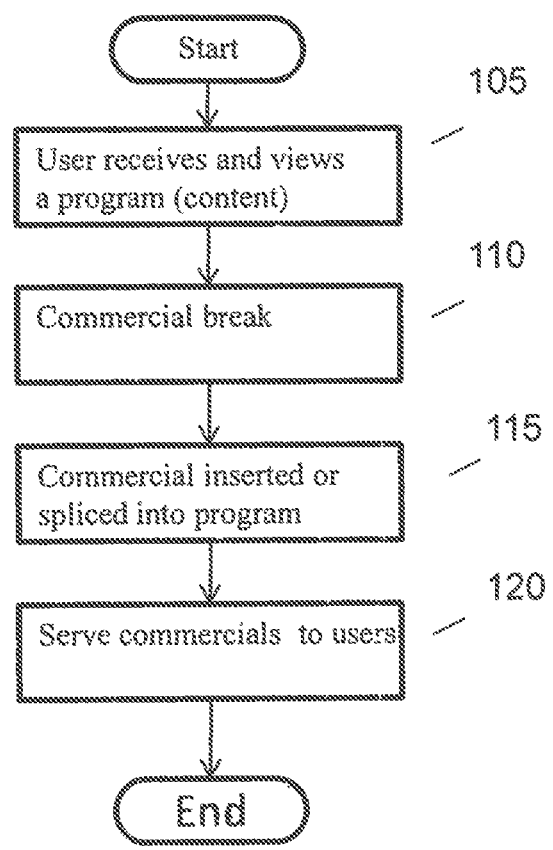
FIG. 1B is a flowchart of the current model of ad (commercial) viewing.

Referring now to FIG. 1B, which is a flowchart of the current model of ad (commercial) viewing. At 105 the user receives and views content (e.g., a TV program or a movie or any other content, which may include audio, video or multimedia content). The content may be received from (provided by) a content provider (such as a Multiple System Operator (MSO) such as Comcast, Verizon FIOS, Atlantic Broadband or a local cable provider), a satellite system operator (such as one operated by DirecTV) or the internet. At 110 in accordance with metadata contained in the content or based on time, the content provider interrupts the content for a commercial break. At 115, the content provider inserts or splices an ad (commercial) into the content (program, movie, etc.). At 120 the inserted (spliced) ad is served to the users (viewers). The content and the ads are both broadcast (multicast) to the users (viewers, customers, clients).

Figure 1C:
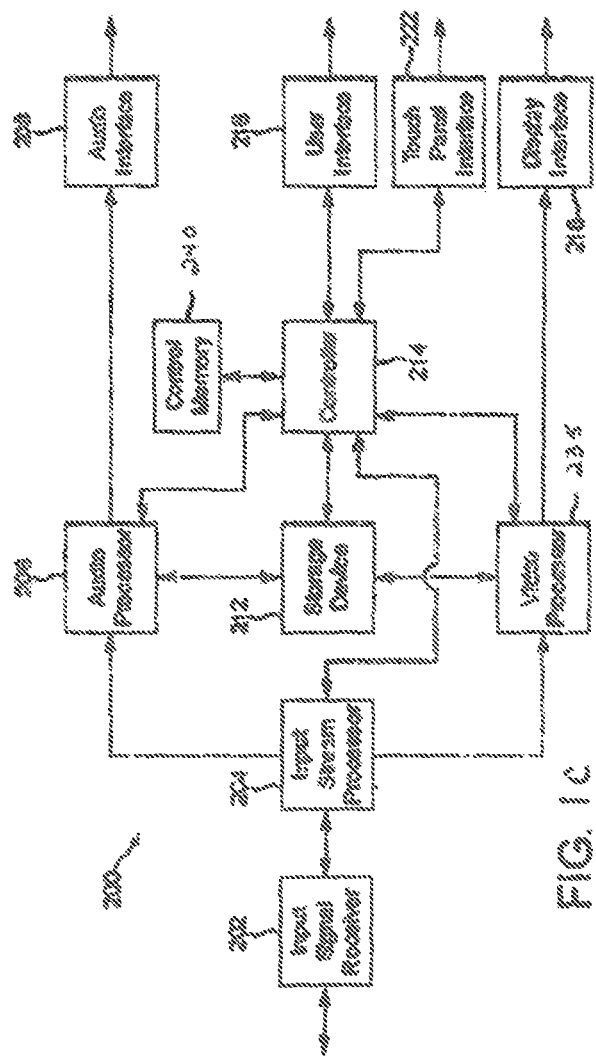
FIG. 1C is a block diagram of an exemplary receiving device.

FIG. 1C is a block diagram of an exemplary receiving device. Receiving device 200 may operate similar to the receiving device described in FIG. 1A and may be included as part of a gateway device, modem, STB or other similar communications device. Receiving device 200 shown may also be incorporated into other systems including an audio device or a display device. In either case, several components necessary for complete operation of the system are not shown in the interest of conciseness, as they are well known to those skilled in the art.

In receiving device 200, the content is received by an input signal receiver 202, which may be one of several known receiver circuits used for receiving, demodulation and decoding signals provided over one of the several possible networks including over-the-air, cable, satellite, Ethernet, fiber and phone line networks. The desired input signal may be selected and retrieved by the input signal receiver 202 based on user input provided through a control interface or touch panel interface 222. Touch panel interface 222 may include an interface to a touch screen device. Touch panel interface 222 may also be adapted to interface to a cellular phone, a tablet device, a mouse, a standard remote control device, a high end remote control device or any device with similar capabilities. Input signal receiver may also be adapted to provide a back channel to provide feedback regarding user rating of a commercial.

The decoded output signal is provided to an input stream processor 204. Input stream processor 204 performs the final signal selection and processing, and includes separation of video content from audio content for the content stream. The audio content is provided to an audio processor 206 for conversion from the received format, such as a compressed digital signal to an analog waveform signal. The analog waveform signal is provided to an audio interface 208 and further to the display device or audio amplifier. Alternatively, the audio interface 208 may provide a digital signal to an audio output device or display device using a High-Definition Multimedia Interface (HDMI) cable or alternative audio interface such as via a Sony/Phillips Digital interconnect Format (SPDIF). The audio interface may also include amplifiers for driving one or more sets of speakers. The audio processor 206 also performs any necessary conversion for the storage of the audio signals.

The video output from the input stream processor 204 is provided to a video processor 235. The video signal may be one of several formats. Video processor 235 provides, as necessary, a conversion of the video content based on the input signal format. Video processor 235 also performs any necessary conversion for the storage of the video signals.

Storage device 212 stores audio and video content received at the input. Storage device 212) allows later retrieval and play back of the content under the control of a controller 214 and also based on commands, e.g., navigation instructions such as fast-forward (FF) and rewind (Rew), received from a user interface 216 and/or touch panel interface 222. Storage device 212 may be a hard disk drive, one or more large capacity integrated electronic memories, such as static RAM (SRAM) or dynamic RAM (DRAM) or may be an interchangeable optical disk storage system such as a compact disk (CD) drive or a digital video disk (DVD) drive.

The converted video signal from video processor 235, either originating from the input or from storage device 212, is provided to the display interface 218. Display interface 218 further provides the display signal to a display device of the type described above. Display interface 218 may be an analog signal interface such as red-green-blue (RGB) or may be a digital interface such as HDMI. It is to be appreciated that display interface 218 generates various screens for presenting the search results in a three dimensional grid as will be described in more detail below.

Controller 214 is interconnected via a bus to several of the components of device 200, including input stream processor 202, audio processor 206, video processor 235, storage device 212 and a user interface 216. Controller 214 manages the conversion process for converting the input stream into a signal for storage on the storage device or for display (rendering). Controller 214 also manages the retrieval and play back of stored content. Furthermore, as will be described below, controller 214 performs searching of content and the creation and adjusting of the grid display representing the content, either stored or to be delivered via the delivery networks described above.

Controller 214 is further coupled to control memory 240 (e.g., volatile or non-volatile memory including RAM, SRAM, DRAM, ROM, programmable ROM (PROM), flash memory, electronically programmable ROM (EPROM), electronically erasable programmable ROM (EEPROM), etc.) for storing information and instruction code for controller 214. Control memory 240 may store instructions for controller 214. Control memory may also store a database of elements, such as graphic elements containing content. The database may be stored as a pattern of graphic elements. Alternatively, the control memory may store the graphic elements in identified or grouped memory locations and use an access or location table to identify the memory locations for the various portions of information related to the graphic elements. Additional details related to the storage of the graphic elements will be described below. Further, the implementation of control memory 240 may include several possibilities, such as a single memory device or alternatively more than one memory circuit communicatively connected or coupled together to form a shared or common memory. Still further, the memory may be included with other circuitry, such as portions of bus communications circuitry, in a larger circuit.

The user interface also includes an interface for a microphone. The user interface may be wired or wireless, allowing for the reception of an audio signal for use in the present invention. Such an audio command would have to be processed through a speech recognition unit (not shown). The user interface process of the present invention employs an input device to provide feedback for the targeted advertising ranking system and method of the present invention. To allow for this a touch panel device may be interfaced via the user interface and/or the touch panel interface. A touch panel device allows operation of various devices including receiving device or the STB or to provide input to the targeted advertising ranking method and system of the present invention. The touch panel device allows input based on hand movements or gestures or by touching options rendered to (displayed on) the touch panel device. The touch panel device may also be included as part of a remote control device. Feedback to the server may be accomplished, for example, via the user interface 216 or the touch panel interface 222, both of which are in two-way communication with controller 214. Controller 214 is in two-way communication with input stream processor 204, which is in two-way communication with input signal receiver 202. Input signal receiver 202 is in two-way communication with various components as indicated in FIG. 1A.

In a first embodiment of the present invention, a user (viewer) can rank (rate) ads similar to the Nielsen rating system used to rate TV programs. The user can update his/her ad ranking (rating) at any time. In a preferred embodiment this occurs at the time an ad (commercial) is played (rendered) so that the user is viewing the ad (commercial) at the time the user ranks (rates) the ad so it is fresh in the user's mind.

Figure 2:
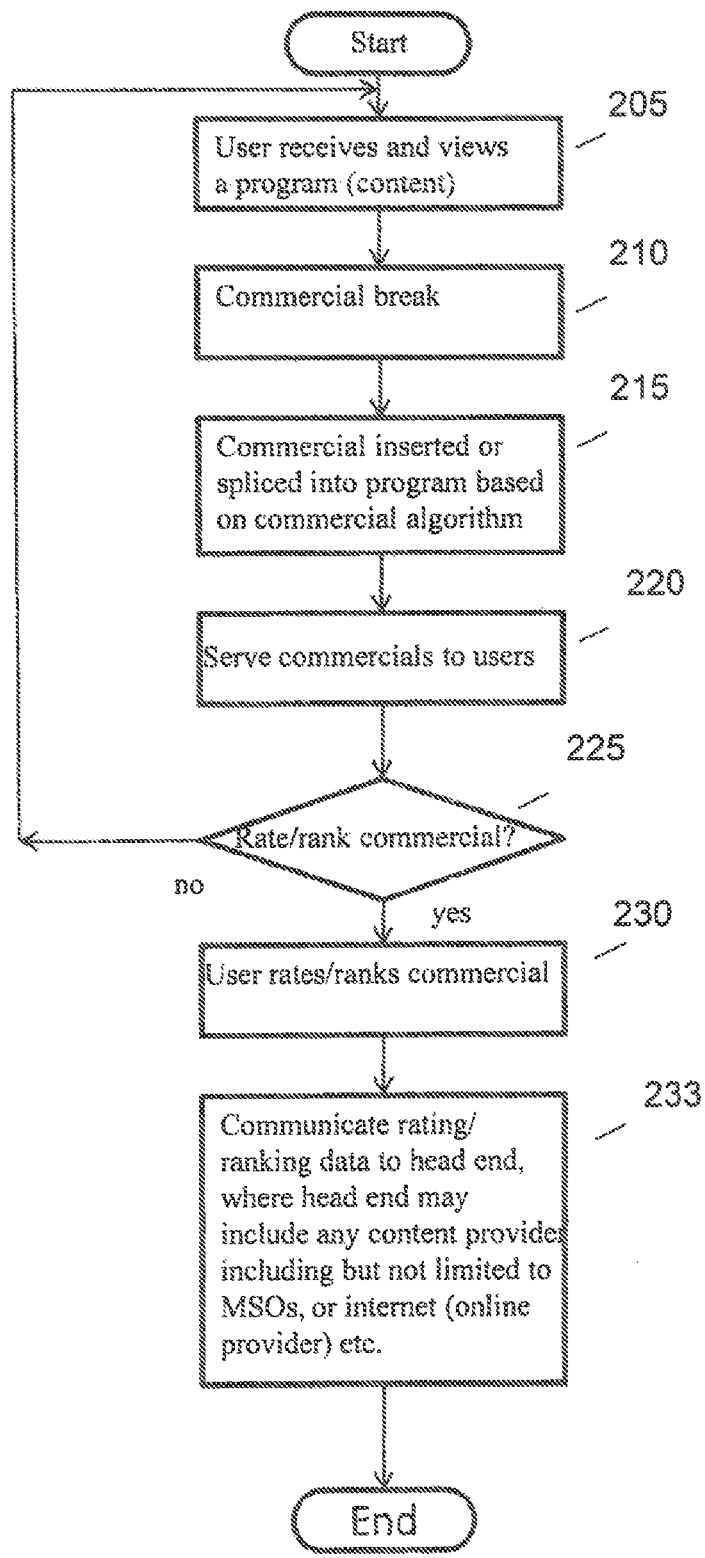
FIG. 2 is a flowchart of the targeted advertising ranking (rating) system of the present invention from the user perspective.

Referring now to FIG. 2, a flowchart of the targeted advertising ranking (rating) system of the present invention from the user perspective is described. A user device may be an interactive TV (2D or 3D), a computer, a laptop, a dual mode smart phone, a personal digital assistant, a tablet device, an iPod, an iPhone, an iPad or any equivalent device for receiving content. At 205 the user receives and views content (e.g., a TV program or a movie or any other content, which may include audio, video or multimedia content). The content may be received from (provided by) a content provider (such as a Multiple System Operator (MSO) such as Comcast, Verizon FIOS, Atlantic Broadband or a local cable provider), a satellite system operator (such as one operated by DirecTV) or the internet. At 210 in accordance with metadata contained in the content or based on time, the content provider interrupts the content for a commercial break. At 215, the content provider inserts or splices an ad (commercial) into the content (program, movie, etc.). At 220 the inserted (spliced) advertisement is served to the users (viewers). The content and the ads are both broadcast (multicast) to the users (viewers, customers, clients). The user (viewer) is invited to rank (rate) the ad (commercial). At 225 a test is performed to determine if the user wants to rank (rate) the advertisement. The user may be further induced to rank (rate) advertisements by the content provider through direct payments to the user or coupons that the user can use for the advertised products or points earned towards a product or service or monthly bill reduction based on the number of advertisements ranked (rated). If the user does not want to rank (rate) the advertisement, then processing proceeds to 205 after the advertisement finishes airing. The lack of interest in ranking the advertisement may be taken to mean the user does not wish to participate in the ad ranking program or that the user has stepped out of the room and is not viewing the advertisement. If the user wants to rank (rate) the advertisement, at 230 the user provides a ranking of the advertisement. The ranking may be a numeric value or may be a "thumbs up or down" meaning the user likes or dislikes the advertisement. At 233 the user ranking data (information) is communicated to the content provider, where the content provider may include but is not limited to MSOs, satellite providers or internet providers. The communication to the content provider may be performed directly by the user device or by a receiving device such as described above. The content provider may use the user advertisement ranking information in any number of ways as will be described in more detail below.

The user may indicate both his/her desire to participate in the advertisement ranking and the actual advertisement ranking by any number of means including using a button of an IR remote control device or using a touch screen or using hand movements or gestures via a gesture sensing controller such as may be connected to user interface 216.

In a second embodiment of the present invention, the first embodiment is enhanced to include the ability to splice in user preferred ads using an advertisement server (ad server) and a set top box (STB). This is one way that the content provider may use the ad ranking information. The method of the present invention from the user perspective (shown in FIG. 2) does not change appreciably. The only difference will be that the user will see ads that the user prefers because the head end (content provider) will modify the user's commercial (advertisement) algorithm to display ads that the user prefers. In this case, the content will still be broadcast (multicast) to any users requesting the content but the ads will be unicast to specific users (households, offices). The preferred embodiment will transmit the ads to the local STB, which will splice the advertisements in at the scheduled commercial break. Digital insertion is the means by which the advertisements are selected. The ad server could supply specific ads to be spliced into the content based on its data base or metadata. The relevant data could be decoupled from the ad (advertisement, commercial) itself. There are multiple ways that this could be accomplished using the ad server or the receiving device or even the home gateway as the engine for making decisions and/or accomplishing the splicing.

Figure 3:
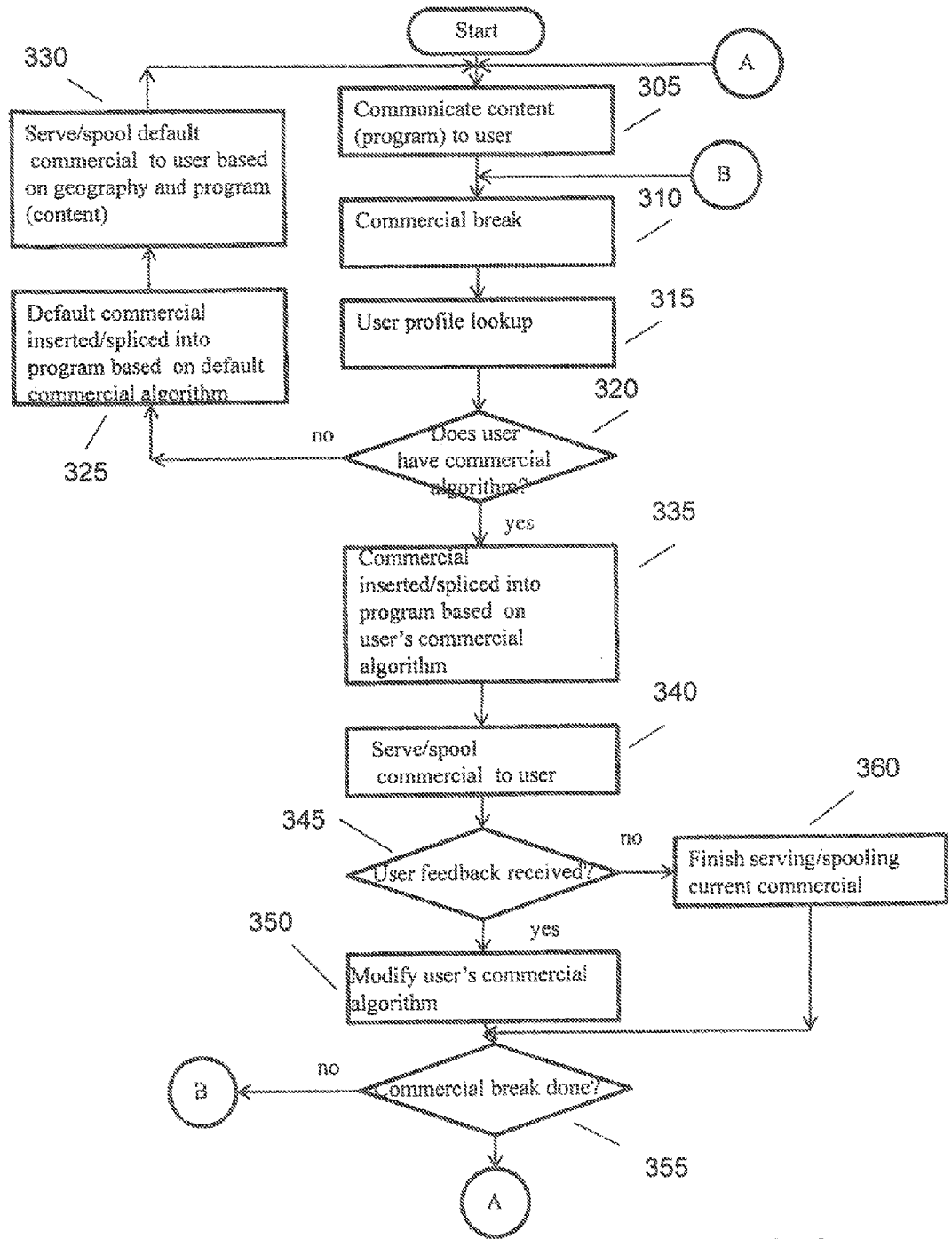
FIG. 3 is a flowchart of an exemplary embodiment of the method of the present invention from the perspective of a content provider.

FIG. 3 is an exemplary embodiment of the method of the present invention from the perspective of a content provider. At 305 the content provider (e.g., head end) communicates content to the user(s). Content is multicast or broadcast to the user device for the user to view. At 310 according to a commercial break algorithm, a commercial break occurs or is imminent (scheduled or to be scheduled). A commercial break may be scheduled based on content metadata such as a scene change. The content provider (e.g., head end) looks in its database to locate the user's profile. At 320 a test is performed to determine if a profile for this particular user was located. If no profile for this particular user was located then at 325, the content provider inserts (splices) a default commercial (advertisement) into the content based on the default commercial selection algorithm available at the content provider. At 330, the content provider serves (spools) the default commercial selection algorithm. The default commercial may be based on geography (demographics) and/or program content. If a profile was located for this particular user then at 335, the content provider inserts (splices) one or more commercials into the content based on the user's profile and commercial selection algorithm. If certain advertisements are "liked' (or ranked, for example, a 3 (or more) on a scale of 1 to 5, with 5 being very much liked) then the advertisement would be aired (served, shown) more often. If certain advertisements are "disliked' (or ranked, for example, a 2 (or less) on a scale of 1 to 5, with 5 being very much liked) then the advertisement would be aired (served, shown) less often. For example, if the user (viewer) continues to "dislike' diaper commercials, the user's commercial selection algorithm begins to show not only fewer diaper commercials but fewer commercials involving products for very young children. On the other hand, if the user (viewer) continues to "like" beer commercials, then advertisements for beer and other alcohol products would be aired (served, shown) more often. It may also be possible to discern whether the user (viewer) likes advertisements that are humorous. At 340 the selected advertisements are served (spooled) to the user device directly or by way of a receiving device as described above. In a preferred embodiment this is accomplished by transmitting (sending, communicating) the selected advertisement(s) to the user device directly or a receiving device (such as a local STB, DVR or similar device) to be spliced into the content locally at the scheduled commercial break. Since digital insertion is the means by which the advertisements are selected, the advertisements have to have metadata associated with each ad to select the ads that the user prefers. At 345 a test is performed to determine if the content provider received the user's feedback (advertising ranking). User feedback may also include a time for re-airing the ranked (rated) advertisement. The time may be a specific time or a time period after which the advertisement can be re-aired. For example, the user may generally "like' a certain commercial but feel that it is being repeated too often so can request that it not be aired (served, shown, rendered, displayed) for an hour. If the content provider received the user's feedback, then at 350 the content provider modifies this particular user's commercial selection algorithm. At 355 a test is performed to determine if the commercial break is finished (done, over, complete). If the commercial break is not finished, then processing proceeds to 310. If the commercial break is finished, then processing proceeds to 305. If the content provider has not received user feedback then at 360, the content provider finishes serving (spooling) the current commercial and processing proceeds to 355.

It should be noted that certain very popular events (such as the Super Bowl) may be exempted (excluded) by the broadcaster from the above described ranking method. In such cases the user's commercial selection algorithm and/or the ability to rank (rate) ads may be disabled or the ability to rank (rate) ads may remain enabled while the commercial selection algorithm is disabled.

Figure 4:
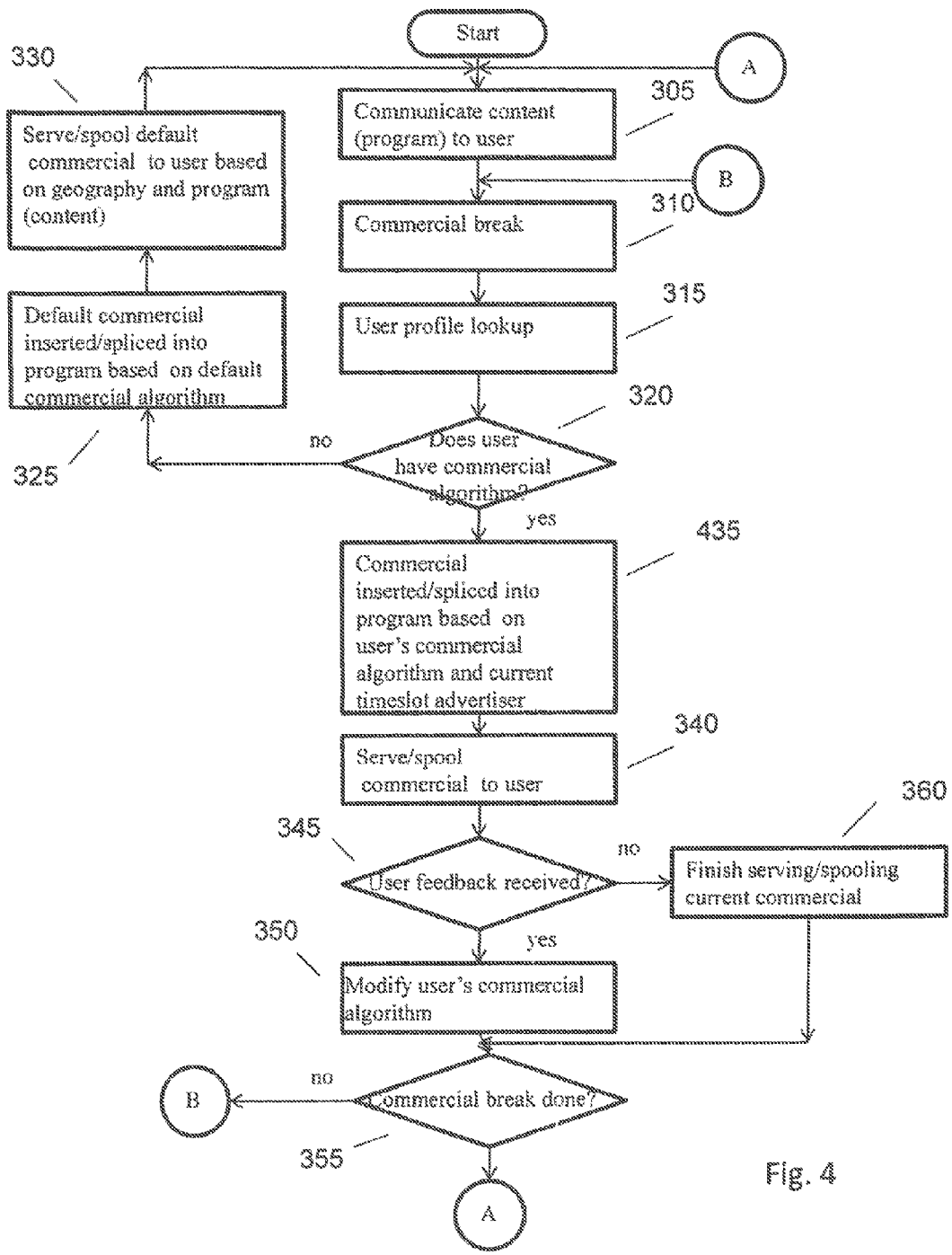
FIG. 4 is an alternative exemplary embodiment of the method of the present invention from the perspective of a content provider.

FIG. 4 is an alternative exemplary embodiment of the method of the present invention from the perspective of a content provider. FIG. 4 is the same as FIG. 3 except that 435 replaces 335 so the above description will not be repeated. At 435, the selected commercial(s) (advertisement(s)) is (are) inserted (spliced) into the content based on the user's commercial selection algorithm and the current time slot advertiser. A particular advertiser may have selected and be paying for their advertisement to run in a particular time slot so that one of this advertiser's commercials must run in this time slot. However, if the advertiser is, for example, Procter and Gamble, which manufactures many products including toothpaste and diapers, then the ad (commercial, advertisement) that is most in line with the user's preferences based on this particular user's commercial selection algorithm will be served (spooled, played, rendered, delivered). Thus, assuming that the advertiser has advertisements for several of its products available, then an advertisement for this advertiser would always be played in this time slot but it may not be the advertisers preferred or suggested advertisement.

In a third embodiment of the present invention, the first embodiment of the present invention is enhanced to include advertising insertion control using social networking feedback. In this embodiment, the user can send advertisements that they like to their BFFs using any one of the plurality of social networking sites and ask their friends to rank the advertisements as well. The advertiser thus gets even wider exposure (free) with the added benefit that the original viewer's (user's) BFFs get the advertisement with an endorsement (that the original user liked the advertisement) from the original user. In this embodiment, the user would operate as indicted by FIG. 2 but in lieu of or in addition to step 233, the user would via a user device communicate (transmit, send) the advertisement that the user liked (enjoyed) and ranked to one or more social networking websites to the user's BFFs. Social networking sites like Twitter have "trending" topics that are related to special hashtags that can be sent as part of the message. An advertiser would be able to easily see that their ad is trending and follow the discussion of their ad (as Twitter is a public forum). Advertisers could also set up FaceBook pages or the like (which many have already done) and users might be able to push their ratings to these sites. A user might not only choose to "like" an ad, but could send a notification to their friends that they disliked a commercial. This may induce others to watch the ad to see what they think of it, or it may cloud public opinion much like a newspaper or magazine article might.

Figure 5:
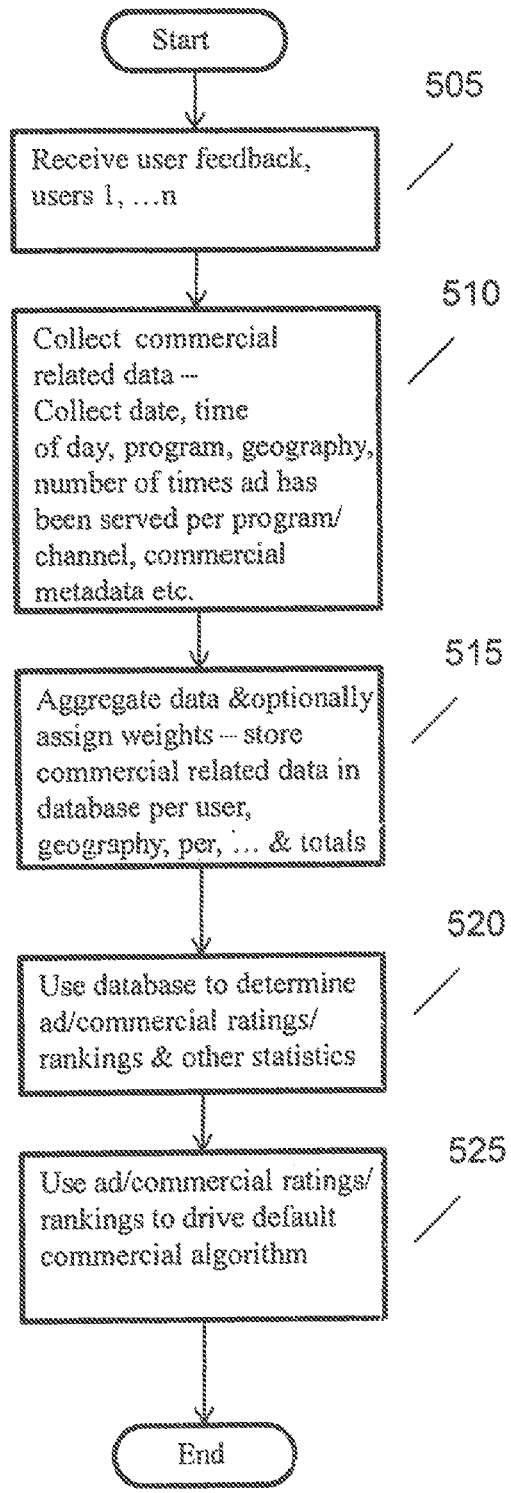
FIG. 5 is an exemplary embodiment of the present invention from the perspective of the content provider for receiving and aggregating users advertising rankings.

In a fourth embodiment of the present invention, certain advertisement rankings (ratings) are provided to advertisers anonymously. FIG. 5 is an exemplary embodiment of the present invention from the perspective of the content provider for receiving and aggregating users advertising rankings. At 505 the content provider receives users' feedback (advertising rankings). The advertising rankings may be a numeric value or simply a "like' or "dislike". At 510, the content provider collects commercial related data as well as the day and the time that the advertisement (commercial) was aired, the geography (demographics), the number of times that the advertisement was aired (served) per program and/or per channel and the commercial metadata. At 515 the collected data is aggregated and optionally assigned weights. The aggregated collected data is stored in any or all of a variety of ways including per user, by the date and/or time of day, by the geography (demographics) by the program and/or by the channel. It should be noted that demographics are available at least by using census data, which is in many cases at the (city) block level. At 520 the content provider accesses and uses the aggregated advertising ranking data in the database to determine in which shows (programs, channels) and/or in which geographic region (demographics) and/or at what time and/or day of the week to air (serve) certain advertisements. The content providers can offer this information to advertisers either for a fee or as an inducement to place their advertisements with this service. In this way, the advertisers do not receive any personal data so privacy is retained. Advertisers are, however, better able to allocate their marketing budgets and better target consumers that are likely to be interested in buying their products. At 525, the content provider also uses the advertisement rankings to update its default commercial selection algorithm. This gives the content provider (or the advertiser through the content provider) the ability to remove ads that are not received well by users (viewers, consumers, clients, customers) or to rotate advertisements by day of the week, time of day, program, channel, demographics, etc.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for serving targeted advertising via a user device, said method comprising:
receiving content at said user device;
rendering said received content;
receiving a first commercial at said user device, wherein said first commercial was spliced into said content based on a default commercial selection algorithm at a commercial break within said received content, said default commercial selection algorithm being based on at least one of demographics and program content;
determining, at said user device, if the received content is exempt from a ratings function;
upon determining said content is not exempt from the ratings function, determining if a user profile exists and if feedback rating said first commercial is received;
accepting the feedback rating said first commercial;
communicating said feedback rating said first commercial to a content provider;
receiving additional content;
rendering said received additional content; and
receiving a second commercial at said user device, wherein said second commercial was spliced into said additional content at a commercial break within said received additional content, said second commercial being selected based on a user specific commercial selection algorithm particular for said user device,
wherein, if said user profile is determined to exist, said user specific commercial selection algorithm is obtained by modifying said default commercial selection algorithm by said user profile and said received feedback rating said first commercial, and if it is determined said user profile does not exist, said user specific selection algorithm is obtained by modifying said default commercial selection algorithm by said received feedback rating said first commercial; and
upon determining said received content is exempt from the ratings function, disabling at least one of the ratings function and said user specific commercial selection algorithm.

2. The method according to claim 1, wherein said content provider is a multiple system operator, an online provider or a broadcast provider.

3. The method according to claim 1, wherein said modified default commercial selection algorithm further selects said second commercial based on at least one of demographics and said content.

4. The method according to claim 1, wherein said feedback rating said first commercial is also provided to an ad server.

5. A method for a content provider to provide targeted advertising to a user device, said method comprising:
communicating content to said user device for rendering;
determining if said content is exempt from a ratings function;
upon determining said content is not exempt from the ratings function, retrieving a user profile from said user device;
determining if a user specific commercial selection algorithm related to said user profile exists;
upon determining said user specific commercial selection algorithm exists, selecting said first commercial based on said user specific commercial selection algorithm and said user profile prior to a commercial break within said content;
splicing said first commercial into said content;
communicating said first commercial to said user device;

determining if feedback rating of said first commercial has been received;

modifying said user specific commercial selection algorithm if said feedback rating said first commercial is received;

upon determining no user specific commercial selection algorithm exists, selecting said first commercial and splicing said first commercial into said content based on a default commercial selection algorithm prior to the commercial break within said content; and splicing a second commercial into said content based on said user specific commercial selection algorithm and user profile upon determining said feedback rating of said first commercial has been received;

upon determining said content is exempt from the ratings function, selecting a first commercial based on the default commercial selection algorithm prior to a commercial break within said content and disabling at least one of the ratings function and said user specific commercial algorithm.

6. The method according to claim 5, wherein said content provider is a multiple system operator, an online provider or a broadcast provider.

7. The method according to claim 5, wherein said default commercial selection algorithm is further based on at least one of demographics and said content.

8. The method according to claim 5, wherein splicing said first commercial is also based on a current timeslot advertiser.

9. An apparatus for serving targeted advertising to a user device, comprising:

an input signal receiver for receiving content;

a processor for providing said received content and a first commercial for rendering, wherein said first commercial was spliced into said received content based on a default commercial selection algorithm at a commercial break within said received content, and wherein said default commercial selection algorithm is based on demographics and program content;

said processor determining if said received content is exempt from a ratings function;

a user interface for disabling at least one of the ratings function and a user specific commercial algorithm upon determining said received content is exempt from the ratings function;

said user interface determining if a user profile exists and if said feedback rating said first commercial is received upon determining said received content is not exempt from the ratings function;

said input signal receiver communicating said feedback rating said first commercial to a content provider;

and receiving additional content for rendering said additional received content and a second commercial, wherein said second commercial was spliced into said additional received content at a commercial break within said additional received content, said second commercial being selected based on the user specific commercial selection algorithm particular for said user device, wherein, if said user profile is determined to exist, said user specific commercial selection algorithm is obtained by modifying said default commercial selection algorithm by said feedback rating said first commercial and said user profile, and if said user profile is determined not to exist, said user specific commercial selection algorithm is obtained by modifying said default commercial selection algorithm by said feedback rating said first commercial.

10. An apparatus for a content provider to provide targeted advertising to a user device, comprising:

a transmitter for communicating content to said user device for rendering, wherein said transmitter communicates content from one of a broadcast affiliate manager and a content manager and determining if said content is exempt from a ratings function;

an ad server, for splicing a first commercial into said content based on a default commercial selection algorithm upon determining said content is exempt from the ratings function, said default commercial selection algorithm being based on demographics and program content;

a receiving device for disabling at least one of the ratings function and a user specific commercial selection algorithm upon determining said received content is exempt from the ratings function;

said receiving device retrieving a user profile upon determining said content is not exempt from the ratings function;

said receiving device also determining if a user specific commercial selection algorithm related to said user profile exists;

said ad server splicing said first commercial into said content based on said user specific commercial selection algorithm and said user profile prior to a commercial break in said content;

said transmitter serving said first commercial to said user device;

said receiving device also determining if feedback rating of said first commercial has been received;

said receiving device also modifying said user specific commercial selection algorithm if feedback rating said first commercial was received;

said ad server also splicing said first commercial into said content based on said default commercial selection algorithm prior to the commercial break if no user specific commercial selection algorithm was located; and said ad server also splicing a second commercial into said content based on said user specific commercial selection algorithm modified by said feedback rating said first commercial and user profile if said user specific commercial selection algorithm was located.

11. The apparatus according to claim 9, wherein said content provider is a multiple system operator, an online provider or a broadcast provider.

12. The apparatus according to claim 9, wherein said modified default commercial selection algorithm further selects said second commercial based on at least one of demographics and said content.

13. The apparatus according to claim 9, wherein said input signal receiver also provides said feedback rating said first commercial to an ad server.

14. The apparatus according to claim 10, wherein said content provider is a multiple system operator, an online provider or a broadcast provider.

15. The apparatus according to claim 10, wherein said as server performs said first splicing based on a current timeslot advertiser.

16. A method for serving targeted advertising via a user device, said method comprising, at the user device:

receiving content;

rendering said received content;

receiving a first commercial, wherein said first commercial was spliced into said content based on a default commercial selection algorithm at a commercial break within said received content, said default commercial selection algorithm being based on demographics and program content;

determining if the received content is exempt from a ratings function;

upon determining said content is not exempt from the ratings function, determining if a user profile exists and if feedback rating said first commercial is received;

accepting the feedback rating said first commercial;

communicating said feedback rating said first commercial to a content provider;

receiving additional content;

rendering said received additional content;

receiving a second commercial by said user device, said second commercial being selected based on a user specific commercial selection algorithm particular for said user device;

said second commercial being spliced into said additional content at a commercial break within said received additional content, wherein, if said user profile is determined to exist, said user specific commercial selection algorithm is obtained by modifying said default commercial selection algorithm by said feedback rating; said first commercial and said user profile, and if said user profile is determined not to exist, said user specific commercial selection algorithm is obtained by modifying said default commercial selection algorithm by said feedback rating said first commercial; and upon determining said content is exempt from the ratings function, disabling at least one of the ratings function and a user specific commercial algorithm.

17. An apparatus for serving targeted advertising, said apparatus comprising:

an input signal receiver for receiving content;

a processor for providing said received content and a first commercial for rendering, wherein said first commercial was spliced into said received content based on a default commercial selection algorithm at a commercial break within said received content, said default commercial selection algorithm being based on demographics and program content;

said processor determining if said received content is exempt from a ratings function;

a user interface for disabling at least one of the ratings function and a user specific commercial selection algorithm upon determining said received content is exempt from the ratings function;

said user interface determining if a user profile exists and if feedback rating said first commercial is received upon determining said received content is not exempt from the ratings function;

said input signal receiver adapted for communicating said feedback rating said first commercial to a content provider;

said input signal receiver receiving additional content and a second commercial for rendering said additional received content and said second commercial, wherein said input signal receiver splices said second commercial into said additional received content at a commercial break within said additional received content, said second commercial being selected based on a user specific commercial selection algorithm particular for said user device, wherein said user specific commercial selection algorithm is obtained by modifying said default commercial selection algorithm by said user profile and said feedback rating said first commercial if said user profile exists and said user specific commercial selection algorithm is obtained by modifying said default commercial selection algorithm by said feedback rating said first commercial from said user device if said user profile is determined not to exist.

\* \* \* \* \*